United States Patent
McDaniel et al.

(10) Patent No.: US 8,175,580 B1
(45) Date of Patent: May 8, 2012

(54) END-TO-END SECURE WIRELESS COMMUNICATION FOR REQUESTING A MORE SECURE CHANNEL

(75) Inventors: Patrick Drew McDaniel, Chatham, NJ (US); Martin Joel Strauss, Summit, NJ (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 0 days.

(21) Appl. No.: 12/960,829

(22) Filed: Dec. 6, 2010

Related U.S. Application Data

(63) Continuation of application No. 10/842,131, filed on May 10, 2004, now Pat. No. 7,873,350.

(51) Int. Cl.
*H04M 1/66* (2006.01)

(52) U.S. Cl. .................. 455/411; 455/410; 379/112.01; 379/114.14

(58) Field of Classification Search .................. 455/411
See application file for complete search history.

(56) References Cited

U.S. PATENT DOCUMENTS

| | | | | |
|---|---|---|---|---|
| 5,953,323 A * | 9/1999 | Haartsen | | 370/330 |
| 5,995,839 A * | 11/1999 | Coursey et al. | | 455/445 |
| 6,084,969 A * | 7/2000 | Wright et al. | | 380/271 |
| 7,155,518 B2 * | 12/2006 | Forslow | | 709/227 |
| 7,330,463 B1 * | 2/2008 | Bradd et al. | | 370/352 |
| 2003/0139180 A1 * | 7/2003 | McIntosh et al. | | 455/426 |
| 2004/0077349 A1 * | 4/2004 | Barak et al. | | 455/436 |
| 2004/0184425 A1 * | 9/2004 | Lai et al. | | 370/338 |
| 2005/0059390 A1 * | 3/2005 | Sayers et al. | | 455/425 |
| 2005/0090275 A1 * | 4/2005 | Wang | | 455/512 |
| 2005/0148362 A1 * | 7/2005 | Jagadeesan et al. | | 455/555 |
| 2006/0052085 A1 * | 3/2006 | Gregrio Rodriguez et al. | | 455/411 |

* cited by examiner

*Primary Examiner* — Kiet Doan
*Assistant Examiner* — Mazda Sabouri

(57) ABSTRACT

The present invention is a system and method for establishing a secure connection using a public a wireless telephone network. The method utilizes a proxy base station and establishes an encrypted session over the public wireless network between a wireless handset and the proxy base station. The proxy base station further establishes a connection with second communication station such as a landline phone. The proxy base station determines a most secure channel between the base station and the second communication station by consulting a database of channels and associated measures of security.

18 Claims, 4 Drawing Sheets

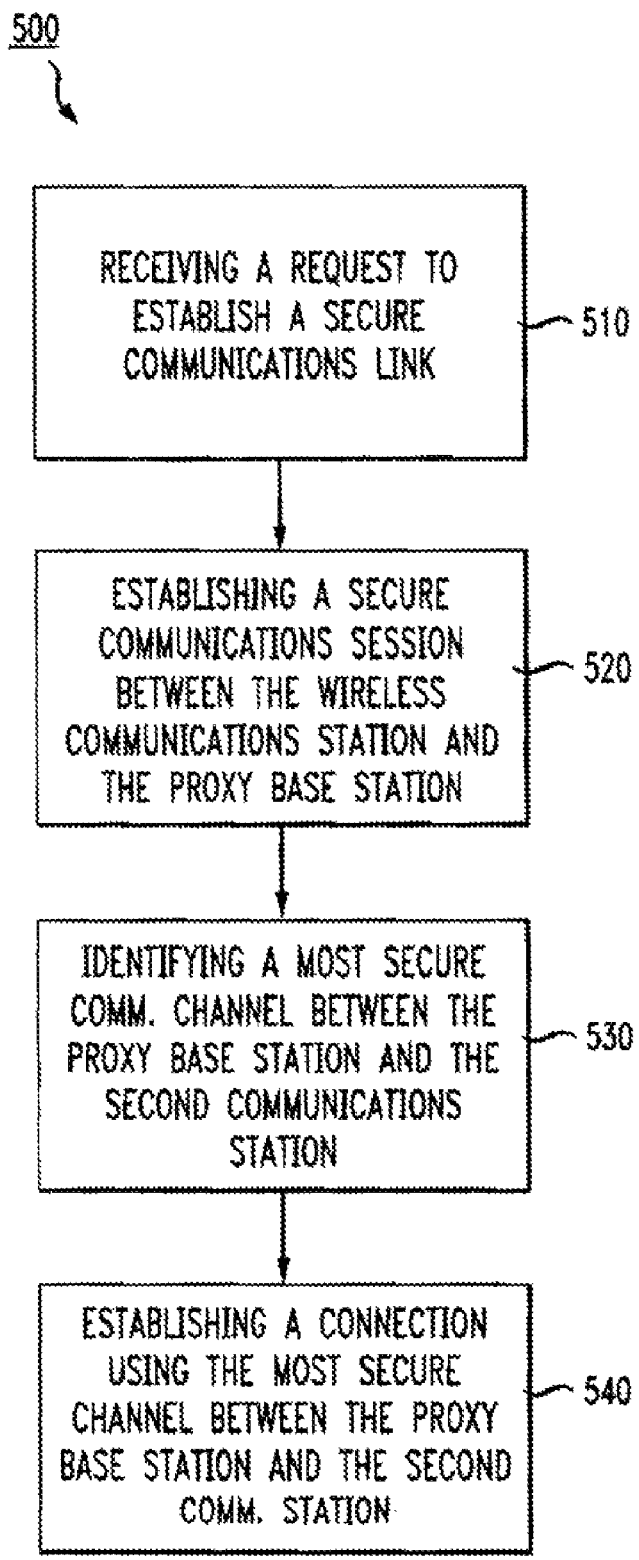

END-TO-END SECURE WIRELESS COMMUNICATION FOR REQUESTING A MORE SECURE CHANNEL

PRIORITY CLAIM

This application is a continuation of co-pending application Ser. No. 10/842,131, entitled "End-to-End Secure Wireless Communication for Requesting a More Secure Channel," filed May 10, 2004, the disclosure of which is incorporated, in its entirety, herein.

FIELD OF THE INVENTION

The present invention relates generally to secure wireless communications, and more particularly, to a system whereby a user of a wireless service may provide his own encryption and authentication.

BACKGROUND OF THE INVENTION

Security provided by wireless telephony service providers is often inadequate for subscribers' needs. Wireless communications are by definition broadcast and therefore accessible to anyone with an appropriate radio frequency (RF) receiver. A malicious eavesdropper need not perform a wiretap or even position himself in close proximity with a legitimate participant in the target conversation. There is therefore a special need for security in wireless telephony.

A wireless telephony subscriber today must rely on the security measures taken by the wireless service provider. Those service providers often provide weak or no encryption, particularly where a call must be handed off between cells managed by different wireless service providers. Because such cell handoff regions are geographically fixed, wireless connections in those regions are particularly vulnerable targets.

Encryption techniques useable on wireless communications systems are available today. For example, the developing 802.11x wireless local area network standard specifically provides for encryption of digital communications transmitted over an RF carrier. Further, virtual private network (VPN) technology may be used to establish a secure digital connection over a path that includes a wireless link. Each of those techniques, however, requires processing power at both ends of the connection sufficient to conduct an encrypted communications session, in addition to digital coding of the voice signal (if the connection is to be used for voice). While those solutions are now commonly used for digital data communications in which laptops or other devices containing powerful processors are available at both ends of the connection, a VPN or other encrypted connection is not a practical solution for telephony because a called land line party is most likely using a simple telephone set that is not capable of conducting an encrypted session, or even of encoding the voice data in digital form. Even handheld wireless telephones with digital capability typically do not have processing capability available for conducting a strongly encrypted communication session. Those handheld wireless telephones that can perform some sort of encryption are generally dedicated to the encryption system of the wireless services provider, and do not support user-initiated encryption.

Handheld wireless communication devices having stronger processing capacity, while not widespread, are becoming more common. For example, devices similar to a personal digital assistant (PDA) are available today with a speaker, microphone and radio transceiver, capable of emulating a wireless telephone, and capable of uploading software. While those devices may be programmed to conduct secure, encrypted sessions, as noted above, those sessions, under today's technology, may be conducted only with other, similarly-configured devices. In the case of a secure telephone conversation, a user of such a PDA would be capable of calling only similarly-equipped users.

U.S. Pat. No. 6,084,969 to Wright et al. describes an encryption system for a pager network. The encryption system includes a proxy that receives and decrypts messages from a sending pager, and then re-encrypts the message with a new session key and transmits it to the receiving pager. Both pagers must be configured to use the encryption system.

There is presently a need for a method and system that can provide secure communications capability for a mobile telephony subscriber. Specifically, the method and system should function without the need for compatible encryption capability at both ends of the call. To the inventors' knowledge, there is no such system or method currently employed to satisfactorily accomplish that task.

SUMMARY OF THE INVENTION

The present invention addresses the needs described above by providing and system and method for establishing a secure communications link from a wireless communications station through a wireless communications network to a second communications station. A request is received at a proxy base station to establish a secure communications link between the wireless communications station and the second communications station. A secure communications session is established through the wireless communications network between the wireless communications station and the proxy base station. Based on a measure of security, a most secure communications channel is identified between the proxy base station and the second communications station. A connection is then established using the most secure channel between the proxy base station and the second communication station.

The step of identifying a most secure channel may include instructions for determining a type of equipment used at the second communications station. Further, that step may comprise accessing a database containing a plurality of communications channel identifiers and associated measures of security.

The step of establishing through the wireless communications network a secure communications session between the wireless communications station and the proxy base station may include using a public key/private key encryption system. Furthermore, that step may include overlaying an encryption system over a security system of the wireless communication network.

The method may include the additional step of establishing a private key encryption session between the wireless communications station and the second communications station. The second communications station may be a wireless communications station.

The step of establishing through the wireless communications network a secure communications session between the wireless communications station and the proxy base station may include using an authentication technique for authenticating an identity of one of the wireless communications station and the second communications station.

The proxy base station may provide a key escrow. The secure communications link may be a voice link, or may be a data link.

The method may further comprise the step of comparing the request to establish a secure communications link between the wireless communications station and the second communications station with previous requests involving the same wireless communications station to detect malicious behavior.

In another embodiment of the invention, a system is provided for secure wireless telephony using a public wireless network. The system includes a proxy base station having a processor and storage media for storing instructions executable by the processor. The instructions are for establishing an encrypted connection to a wireless handset through the public wireless network, for receiving a dialed telephone number from the handset; for identifying a most secure channel between the proxy base station and a station identified by the dialed telephone number; and for establishing a connection through the channel to the station.

The wireless handset may include a speaker, a microphone, a radio transceiver, a processor and storage media storing instructions executable by the processor for encrypting communications through the encrypted connection.

The station identified by the dialed telephone number may be a second wireless handset having a speaker, a microphone, a radio transceiver, a processor and storage media storing instructions executable by the processor for encrypting and authenticating voice communications through the transceiver. In that case, the instructions for establishing a connection to a station identified by the dialed telephone number establish an encrypted connection to the station identified by the dialed telephone number.

The instructions for identifying a most secure channel may include instructions for determining a type of equipment used at the station identified by the dialed telephone number.

The system may further include a database containing a plurality of communications channel identifiers and associated measures of security. In that case, the instructions for identifying a most secure communications channel include instructions for accessing the database.

The instructions for establishing an encrypted connection to a wireless handset through the public wireless network may include instructions for establishing a public key/private key encryption session. Those instructions further may include instructions for overlaying an encryption system over a security system of the wireless communication network.

The instructions for establishing a connection through the channel to the station identified by the dialed telephone number may further be for establishing a private key encryption session between the wireless handset and the station. The station identified by the telephone number may itself be a wireless communications station.

The instructions for establishing an encrypted connection to a wireless handset through the public wireless network may include instructions for using an authentication technique for authenticating an identity of the station identified by the telephone number.

The proxy base station memory may further contain instructions for providing a key escrow. The encrypted connection may be a voice link, or may be a data link.

The system may further comprise a database containing records of past connections established for the wireless handset, and the proxy memory may further contain instructions for comparing the received dialed telephone number with past dialed telephone numbers associated with the wireless handset to detect malicious behavior.

Another embodiment of the invention is a method for establishing a secure communications link from a voice-over-IP communications station through a public Internet network to a second communications station. A request is received at a proxy base station to establish a secure communications link between the voice-over-IP communications station and the second communications station. A secure communications session is established through the public Internet network between the voice-over-IP communications station and the proxy base station. Based on a measure of security, a most secure communications channel is identified between the proxy base station and the second communications station. A connection is then established using the most secure channel between the proxy base station and the second communication station.

BRIEF DESCRIPTION OF THE DRAWINGS

FIG. 5 is a flow chart showing a method according to one embodiment of the invention.

DESCRIPTION OF THE INVENTION

The present invention provides a technique for establishing a secure (encrypted and authenticated) channel for communication from a mobile device through a public wireless network to a proxy base station. The proxy base station further establishes a most secure channel between the base station and another telephone station such as a landline phone or another wireless device. The inventive technique thereby provides an advance in the security of wireless communications without requiring massive changes to the wireless infrastructure, and without requiring the use of special equipment at both ends of a connection.

Figure 1:
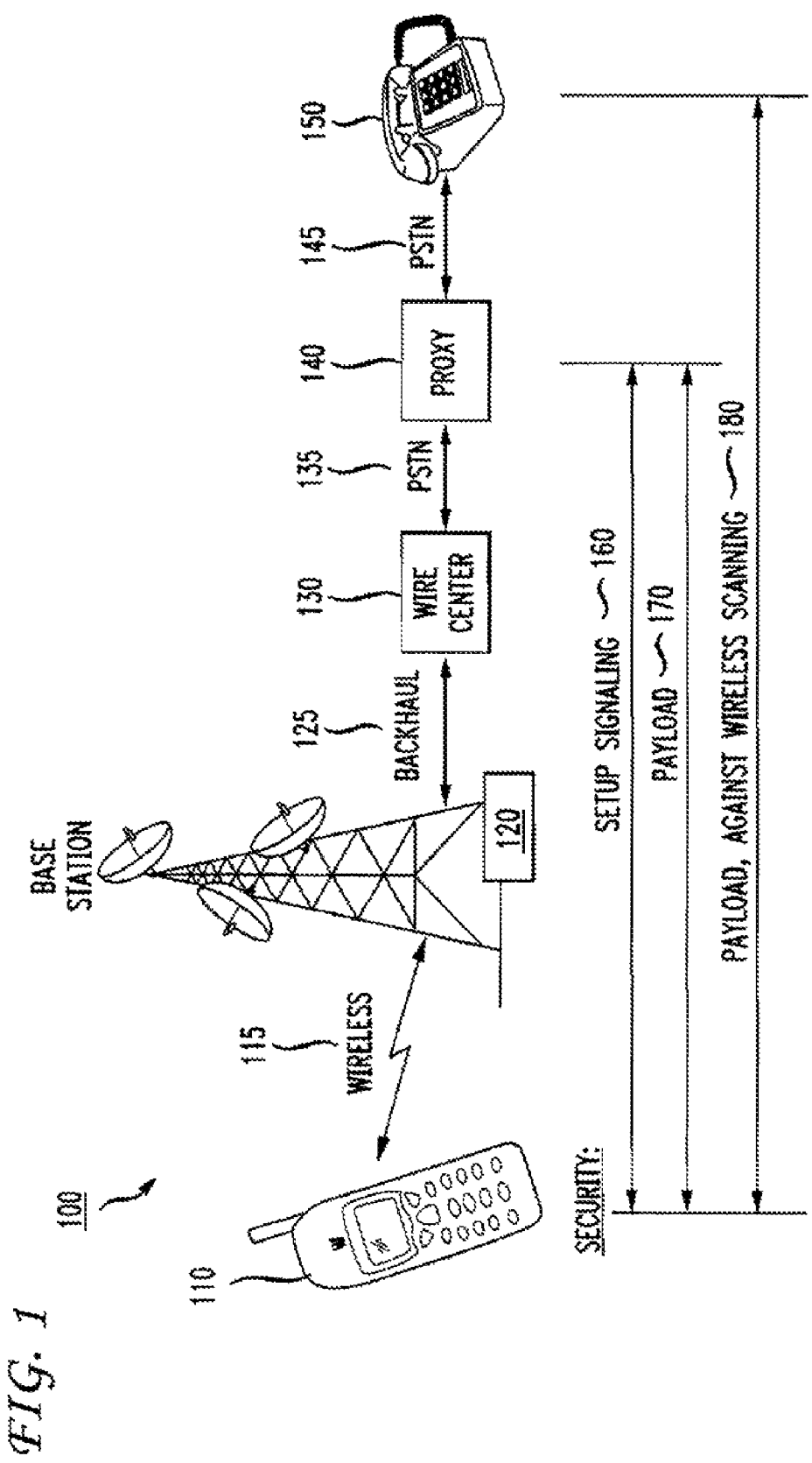
FIG. 1 is a schematic diagram of a secure wireless communication system according to an embodiment of the invention incorporating a wireless phone and a landline phone.

An example of a secure communications channel 100 according to one embodiment of the invention is shown in FIG. 1. A mobile device or handset 110 includes a speaker and microphone as well as a processor providing computational power (such as in a PDA, as is known in the art). The wireless handset 110 communicates with a wireless base station 120 using an RF signal 115, as is also known in the art. That RF signal is broadcast throughout a geographic area or cell, and may be intercepted in that area by anyone having a properly-configured RF receiver. In the prior art, a user of the handset 110 is therefore completely dependent on the security precautions taken by the wireless service provider to secure his communications over the wireless network.

The signal from the base station 120 is transmitted over a land-line backhaul 125 to a wire center 130. The wire center 130 contains switching equipment, as is known in the art, to connect calls from the wireless network to lines of the public switched telephone network (PSTN) 135.

In the present invention, a call from the handset 110 is directed through the PSTN 135 to a special-purpose proxy base station 140. In a preferred embodiment, all calls made using the handset are directed though the proxy 140, and all incoming calls to the handset must pass through the proxy, at least initially.

The base station proxy 140 and handset 110 both have both the computational power and appropriate software to implement an encryption technique to secure communications between those points. Therefore, regardless of the level of security implemented by the providers of the wireless network 115, backhaul 125 and PSTN 135, communications between the handset 110 and proxy 140 are secure to a level determined by the user.

In another embodiment of the invention, the handset 110, base station 120 and wire center 130 may be replaced with any call-originating voice-over IP (VoIP) equipped device (not shown) that has sufficient computational power and appropriate software to implement an encryption technique as discussed above. The VoIP device is connected to the proxy 140 through the public Internet. As with calls using the public wireless telephone network, calls using VoIP over the public Internet will benefit from the security measures described herein, and the scope of the invention is intended to include calls originating as VoIP calls.

The communications channel 100 further utilizes PSTN 145 from the proxy base station 140 to the connected station 150. The PSTN portion 145 of the channel 100 is selected by the proxy base station 140 based on security parameters, as will be described below.

Even if unencrypted, the PSTN 145 and other landline portions of the communications channel 100, while still susceptible to security breaches such as wire tapping, are far more secure than a typical cellular wireless transmission. That is due to the additional effort required to actively perform a wire tap, as compared to simply scanning the wireless telephone frequencies.

The lines 160, 170, 180 of FIG. 1 illustrate the extent of the security provided by a system of the invention. As shown by lines 160 and 170, set-up signaling and payload are protected between the handset and the proxy against all attacks including both wireless scanning and wiretapping. Because the PSTN portion 145 of the communication channel 100 is typically a land line, that portion is not susceptible to wireless scanning either, so the entire communications channel 100 from handset 110 to the connected station 150 is always protected from wireless scanning.

As to the portion 145 of the PSTN that is not part of the encrypted channel between proxy 140 and handset 110, the proxy actively searches for a most secure connection with the terminal 150. For example, the proxy may determine whether the terminal 150 is capable of implementing a secure connection such as an encrypted connection. If so, then such a connection is established. If not, and more than one possible connection channel is available for use, the proxy evaluate those channels and selects the most secure. In one embodiment, the proxy maintains a database of possible channels together with measures of security for each possible channel. That database is accessed to determine a most secure channel.

The proxy may further be configured to consider whether the terminal 150 may be connected via a VoIP link through the public Internet. If so, the proxy determines whether the terminal 150 is capable of implementing an encrypted connection through the Internet and, if so, then such a connection is established.

Figure 2:
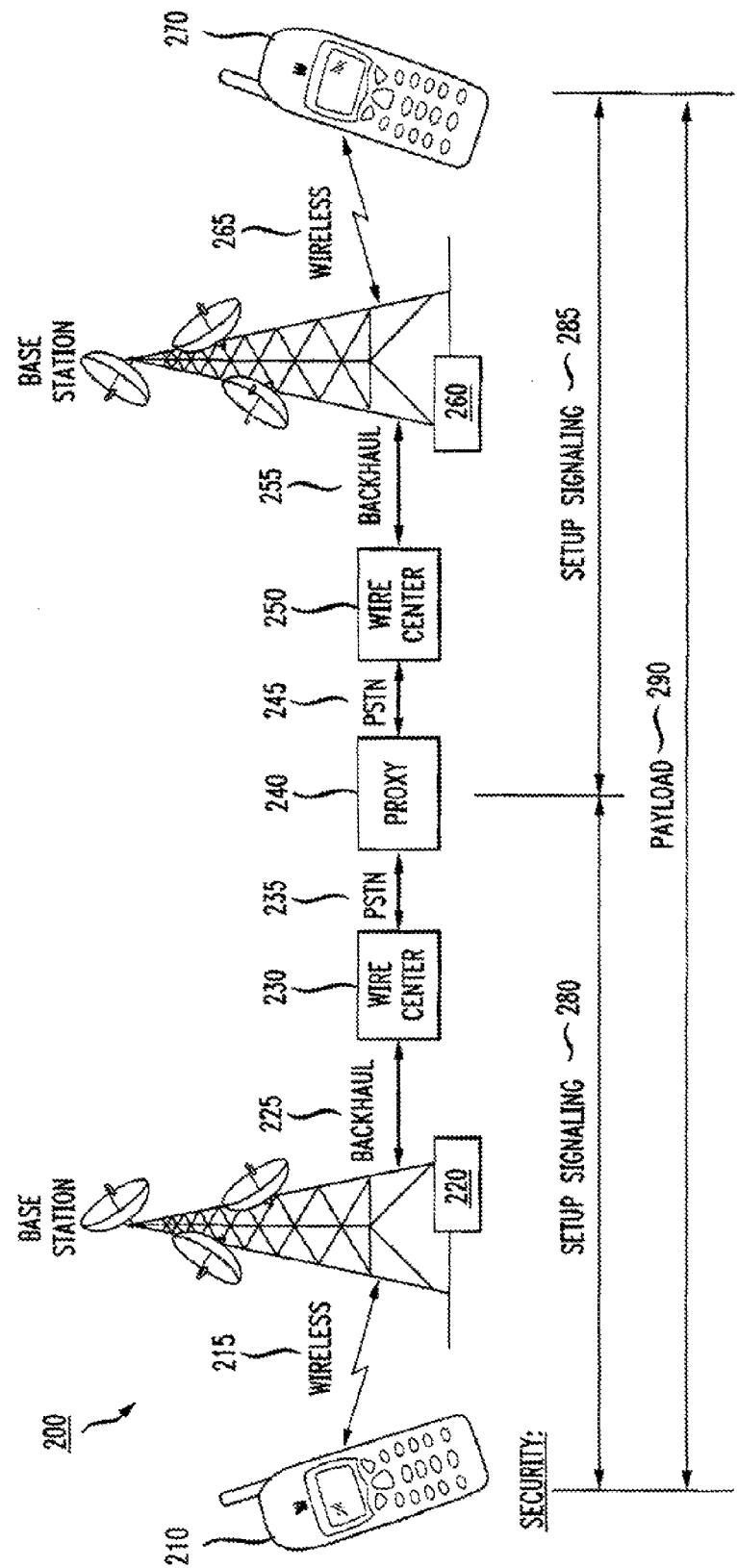
FIG. 2 is a schematic diagram of a secure wireless communication system according to another embodiment of the invention incorporating two wireless phones.

Another embodiment of the invention, wherein the second connected terminal is also a handset with computing power, is shown in FIG. 2. Handset 210 connects to base station 220 through wireless transmission link 215. The base station connects through backhaul 225, wire center 230 and PSTN connection 235 to base station proxy 240. The entire communications channel between the handset 210 and proxy base station 240 is encrypted using software residing in those two network elements.

In the communication channel 200 shown in FIG. 2, the connecting terminal is another handset 270 having computing power and software capable of establishing an encrypted channel between the handset 270 and the proxy base station 240. Thus, regardless of the security measures provided by the operators of the PSTN 245, wire center 250, backhaul 255, base station 260 and wireless link 265, the communication channel established through those network elements has a level of security determined by an encrypted channel between the proxy station 240 and the handset 270.

The lines 280, 285, 290 of FIG. 2 illustrate the extent of the security provided by that embodiment of the invention. As shown by lines 280 and 285, set-up signaling is protected in each of the encrypted portions of the communications channel 200 on either side of the proxy base station 240. The encrypted payload, as shown by line 290, is secure from end to end from interception attacks including wire taps and wireless scanning techniques.

Figure 3:
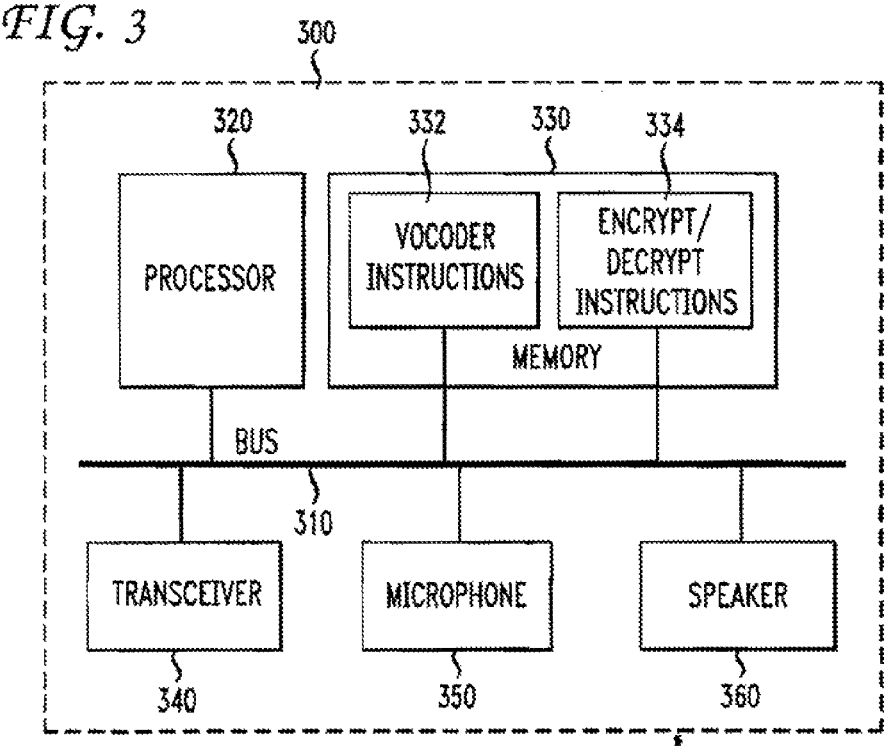
FIG. 3 is a block diagram of a secure wireless handset according to one embodiment of the invention.

A wireless handset 300 as used in the system and method of the present invention is shown schematically in FIG. 3. A plurality of components is shown connected by bus 310, as is known in the art. Other device architectures may be used without departing from the spirit of the invention.

A processor 320 executes instructions loaded from the memory 330, and interacts with the transceiver 340, microphone 350 and speaker 360. The processor must have sufficient capacity and speed to perform voice coding/decoding as well as encryption/decryption of the signals from and to the transceiver.

The memory 330 provides storage for program instructions to be executed by the processor. Those instructions perform the voice coding/decoding function 332 and the signal encryption/decryption function 334. The memory may also serve other functions such as storing the basic operating instructions for the handset, and storing user data such as a telephone number directory.

Figure 4:
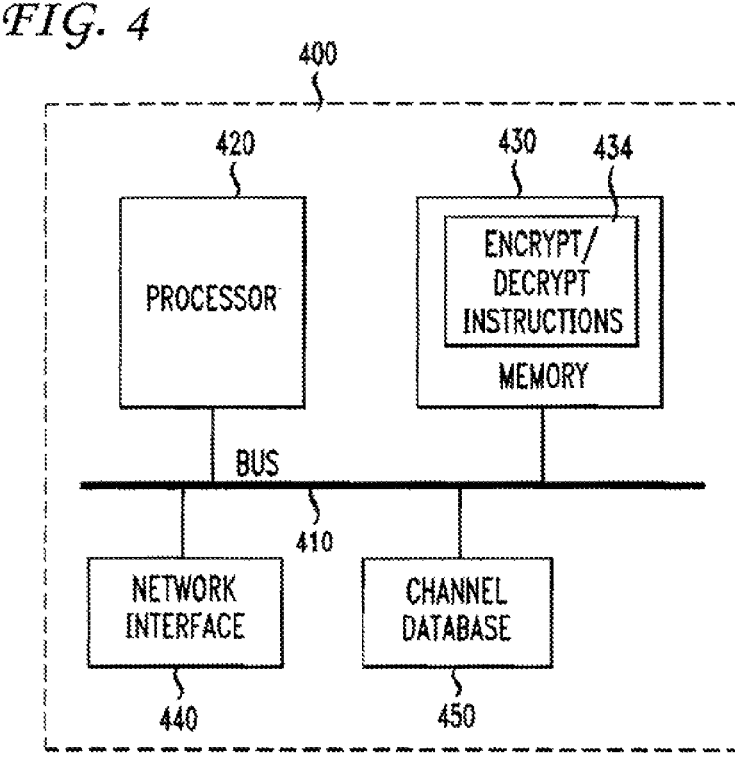
FIG. 4 is a block diagram of a proxy base station according to one embodiment of the invention.

A proxy base station 400 according to one embodiment of the invention is shown schematically in FIG. 4. A bus 410, or another internal network architecture, connects the components.

A processor 420 executes instructions stored in memory 430, including instructions 434 for encrypting and decrypting information from the network interface 440, and instructions for the initial set-up of a secure session with the handset. In a preferred embodiment, the network interface 440 connects to the PSTN. The network interface may also connect to other networks such as a PBX or a LAN.

A channel database 450 may be associated with or accessible by the proxy base station 400. The database comprises records containing an identification of each of a plurality of available communication channels, together with a measure of security for each channel. In identifying a most secure channel for connecting a call through a secure wireless connection to a landline phone, the proxy database 400 may query the database for all channels available to carry the call, and select the channel with the greatest security.

In the case where the operator of the proxy base station is also the operator of at least a portion of the PSTN, such a database may be available in connection with the operation of the network. The network operator may "rate" each known channel and enter a security rating into the corresponding database record for use by the presently described system. As new network services become available to a network operator, those services are "rated" and entered in the database. The rating may be done using an automatic algorithm, or may be done manually based on the intuition and experience of personnel within the network operator.

The proxy base station may further maintain records of all requests to establish a secure communications link. Each request may then be compared to previous requests involving the same wireless communications station, and possibly other data, to detect malicious behavior such as a stolen handset. The proxy base station may have access to data not accessible to a wireless network operator for use in detecting malicious behavior. For example, if the proxy base station is operated specifically for securing corporate employee communications, that station may have access to the employees' travel schedules, clients, etc.

FIG. 5 illustrates one method 500 according to the invention for establishing a secure communications link from a wireless communications station through a wireless communications network to a second communications station. A request is received (step 510) at a proxy base station to establish a secure communications link between the wireless communications station and the second communications station. Initiating the request is preferably transparent to the handset user. For example, all telephone calls dialed by the user are preferably automatically routed to the proxy base station through the wireless network. Each such call is interpreted by the proxy base station as a request to establish a secure link.

A secure communications session is then established (step 520) through the wireless communications network between the wireless communications station and the proxy base station. As noted above, that session is preferably an encrypted channel overlaying security measures that may already be in place for the wireless communication link. The encryption system may use a public key/private key mechanism. In addition to encryption, an authentication technique may be employed in the link between the proxy base station and the wireless communications station for authenticating the identities of the communicating stations. For example, a challenge/response system may be used. Integrity guarantees may also be enforced in the secure communications session, using error checking techniques.

The secure communications link may be a voice link, or may be a data link. Users may send data in addition to voice securely using this protocol, from any computer that can send data over an ordinary wireless phone.

Based on a measure of security, a most secure communications channel is identified (step 530) between the proxy base station and the second communications station. The database 450 (FIG. 4) may be accessed in searching for a most secure channel. Further, the base station proxy may determine the type of equipment used at the second communications channel. For example, if the equipment at the second communications station has processing capability and memory sufficient to establish an encrypted link, then such a link may be established, either between the proxy base station and the second communications device, or from the initiating wireless device directly to the second communication device.

A connection is then established (step 540) using the most secure channel between the proxy base station and the second communication station.

Law enforcement has an interest in intercepting transmissions, which would not be possible for communication that is encrypted from one mobile device to another. The system of the present invention may include a key escrow provided by the proxy base station. When necessary, an appropriate encryption key may be provided to law enforcement.

In an embodiment to be used in a corporate setting, a collection of trusted users, e.g., employees of a corporation subject to a single IT security policy, purchase or lease a proxy base station. Each employee purchases a mobile device, with speaker and microphone, capable of emulating a wireless phone, and capable of running uploaded software. As noted, several such devices are available in the market today. An employee uses his device to make calls in the usual way. Transparent to the employee, the employee's call is routed first to the corporate proxy base station, and, from there, to the desired destination. The channel between the employee and the proxy base station is encrypted and authenticated, using a protocol between the mobile device and the proxy base station. The proxy base station negotiates the most secure channel available from the proxy base station to the destination. If the destination is another employee of the corporation, the two employees can establish a secure channel between them, without trusting even the proxy base station for privacy or authentication.

The proxy base station may be run by a service provider as part of a wireless or landline service offering. The service provider can offer a service wherein participants in a connection between two mobile devices running the protocol need not trust the proxy base station for privacy and authentication. That connection bypasses encryption services provided (or not provided, or provided only weakly) by wireless service providers. Connections with other users are secure against wireless scanning of the subscriber's wireless connection.

Where the proxy base station is maintained by a network services provider that has access to network conditions and information about various possible channels to a call recipient, that information may be utilized to make informed decisions on connecting to the call recipient through a most secure channel. A database may be maintained by the service provider for access by the proxy database in making that determination. That database may contain records corresponding to possible communication channels. Each record further contains a measure of security of the channel. That measure may be assigned based on channel type, and may consider other factors such as the susceptibility of the involved outside plant to wire tapping. The security measures may be calculated in real time based on the particular path traversed by that channel.

In sum, the present invention permits a caller with a general-purpose mobile device and special purpose software to talk securely with another similarly-equipped user, and to secure the wireless part of a channel to a landline user and an ordinary wireless user. Calls may be made with the same effort as currently needed to place a call from a mobile device. In that way, a user may trust landline channels to be secure while getting additional security for wireless channels.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. For example, while the method of the invention is described herein as being used primarily in connection with voice communications, the method and apparatus of the invention may be used with equal effectiveness in data transmissions. For example, the invention may be used in connection with Internet connections from a PDA. It is to be understood that the embodiments shown and described herein are only illustrative of the principles of the present invention and that various modifications may be implemented by those skilled in the art without departing from the scope and spirit of the invention.

What is claimed is:

1. A method for establishing a secure communications link from a first wireless communications station through a wireless communications network to a recipient communications station, comprising:

enabling the first wireless communications station and a plurality of additional wireless communications stations to encrypt communications according to a single corporate information technology security policy;
configuring the wireless communications network to route calls received from the first wireless communications station to a proxy base station;
receiving, at the proxy base station via the wireless communications network, a call from the first wireless communications station directed to the recipient communications station;
determining whether the recipient communications station is one of the plurality of additional wireless communications stations;
if the recipient communications station is one of the plurality of additional wireless communications stations, then establishing through the wireless communications network an encrypted communications session, according to the corporate information technology security policy, between the first wireless communications station and the recipient communications station; and
if the recipient communications station is not one of the plurality of additional wireless communications stations, then identifying, based on a measure of security, a most secure communications channel between the proxy base station and the recipient communications station; and establishing the secure communications link from the first wireless communications station to the recipient communications station, the secure communications link comprising the most secure channel between the proxy base station and the recipient communication station;
further comprising comparing the call from the first wireless communications station directed to the recipient communications station with employees' travel schedules to detect malicious behavior.

2. The method of claim 1, wherein identifying a most secure communications channel includes determining a type of equipment used at the recipient communication station.

3. The method of claim 1, wherein identifying a most secure communications channel further comprises accessing a database containing a plurality of communications channel identifiers and associated measures of security.

4. The method of claim 1, wherein enabling the first wireless communications station and a plurality of additional wireless communications stations to encrypt communications according to a single corporate information technology security policy includes enabling the stations to encrypt using a public key/private key encryption system.

5. The method of claim 1, wherein establishing through the wireless communications network an encrypted communications session, according to the corporate information technology security policy, between the first wireless communications station and the recipient station comprises overlaying the encrypted communications session over a security system of the wireless communication network.

6. The method of claim 1, wherein the secure communications link is a voice link.

7. The method of claim 1, wherein enabling the first wireless communications station and a plurality of additional wireless communications stations to encrypt communications according to a single corporate information technology security policy includes enabling the stations to use an authentication technique for authenticating an identity of another communications station.

8. The method of claim 1, wherein, if the recipient communications station is not one of the plurality of additional wireless communications stations, then the secure communications link from the first wireless communications station to the recipient communications station additionally comprises an encrypted channel between the first wireless communications station and the proxy base station.

9. The method of claim 1, wherein establishing through the wireless communications network an encrypted communications session, according to the corporate information technology security policy, further comprises encrypting the communication session using an encryption key unavailable to the proxy base station.

10. A proxy base station for establishing a secure communications link from a first wireless communications station through a wireless communications network to a recipient communications station, the first wireless communications station and a plurality of additional wireless communications stations being enabled to encrypt communications according to a single corporate information technology security policy, the wireless communications network being configured to route calls received from the first wireless communications station, to the proxy base station, the proxy base station comprising processor and storage media for storing instructions executable by the processor for:
receiving, via the wireless communications network, a call from the first wireless communications station directed to the recipient communications station;
determining whether the recipient communications station is one of the plurality of additional wireless communications stations;
if the recipient communications station is one of the plurality of additional wireless communications stations, then establishing through the wireless communications network an encrypted communications session, according to the corporate information technology security policy, between the first wireless communications station and the recipient communications station; and
if the recipient communications station is not one of the plurality of additional wireless communications stations, then identifying, based on a measure of security, a most secure communications channel between the proxy base station and the recipient communications station; and establishing the secure communications link from the first wireless communications station to the recipient communications station, the secure communications link comprising the most secure channel between the proxy base station and the recipient communication station;
wherein the executable instructions are additionally for comparing the call from the first wireless communications station directed to the recipient communications station with employees' travel schedules to detect malicious behavior.

11. The proxy base station of claim 10, wherein identifying a most secure communications channel includes determining a type of equipment used at the recipient communication station.

12. The proxy base station of claim 10, wherein identifying a most secure communications channel further comprises accessing a database containing a plurality of communications channel identifiers and associated measures of security.

13. The proxy base station of claim 10, wherein the first wireless communications station and a plurality of additional wireless communications stations are additionally enabled to encrypt using a public key/private key encryption system.

14. The proxy base station of claim 10, wherein establishing through the wireless communications network an encrypted communications session, according to the corporate information technology security policy, between the first wireless communications station and the recipient station comprises overlaying the encrypted communications session over a security system of the wireless communication network.

15. The proxy base station of claim 10, wherein the secure communications link is a voice link.

16. The proxy base station of claim 10, wherein the first wireless communications station and a plurality of additional wireless communications stations are further enabled to use an authentication technique for authenticating an identity of another communications station.

17. The proxy base station of claim 10, wherein, if the recipient communications station is not one of the plurality of additional wireless communications stations, then the secure communications link from the first wireless communications station to the recipient communications station additionally comprises an encrypted channel between the first wireless communications station and the proxy base station.

18. The proxy base station of claim 10, wherein establishing through the wireless communications network an encrypted communications session, according to the corporate information technology security policy, further comprises encrypting the communication session using an encryption key unavailable to the proxy base station.

* * * * *